(12) United States Patent
Baird

(10) Patent No.: US 11,676,487 B2
(45) Date of Patent: Jun. 13, 2023

(54) METHODS AND SYSTEMS FOR A PARKING ASSIST SYSTEM

(71) Applicant: Alexander Baird, Charleston, SC (US)

(72) Inventor: Alexander Baird, Charleston, SC (US)

(73) Assignee: Alexander Baird, Charleston, SC (US)

( * ) Notice: Subject to any disclaimer, the term of this patent is extended or adjusted under 35 U.S.C. 154(b) by 178 days.

(21) Appl. No.: 17/182,394

(22) Filed: Feb. 23, 2021

(65) Prior Publication Data

US 2021/0280062 A1 Sep. 9, 2021

Related U.S. Application Data

(60) Provisional application No. 62/984,953, filed on Mar. 4, 2020.

(51) Int. Cl.
| | |
|---|---|
| *G08G 1/14* | (2006.01) |
| *H02S 20/10* | (2014.01) |
| *F21S 9/03* | (2006.01) |
| *G06N 20/00* | (2019.01) |
| *F21S 8/08* | (2006.01) |
| *G06N 3/08* | (2023.01) |

(52) U.S. Cl.
CPC ............. *G08G 1/142* (2013.01); *F21S 8/088* (2013.01); *F21S 9/035* (2013.01); *G06N 20/00* (2019.01); *H02S 20/10* (2014.12); *G06N 3/08* (2013.01)

(58) Field of Classification Search
CPC ........ G08G 1/142; H02S 20/10; G06N 20/00; F21S 8/088; F21S 9/035

USPC ...................................................... 340/932.2
See application file for complete search history.

(56) References Cited

U.S. PATENT DOCUMENTS

| | | | | |
|---|---|---|---|---|
| 2005/0229451 A1* | 10/2005 | Mullens | ................. | G09F 11/02 |
| | | | | 40/500 |
| 2011/0131083 A1* | 6/2011 | Redmann | ................ | B60L 53/18 |
| | | | | 705/13 |
| 2017/0345304 A1* | 11/2017 | Oesterling | ............ | G08G 1/147 |
| 2018/0240337 A1* | 8/2018 | Moran | .................... | G08G 1/147 |
| 2018/0247534 A1* | 8/2018 | Williams | ............... | G08G 1/141 |
| 2019/0114916 A1* | 4/2019 | Hohenacker | .......... | G08G 1/142 |
| 2019/0251841 A1* | 8/2019 | Munireddy | ............ | G08G 1/146 |
| 2020/0160710 A1* | 5/2020 | Obayashi | ................ | H04W 4/33 |

* cited by examiner

*Primary Examiner* — Kerri L McNally
(74) *Attorney, Agent, or Firm* — Caldwell Intellectual Property Law

(57) ABSTRACT

A parking assist system wherein the system includes a sensor device configured to detect parking space data and transmit it to a post device, wherein the sensor device includes an energy storage device, and a communication device. The communication device may include a camera. The system includes a post device in communication with the sensor device, the system configured to collect parking space data transmitted from a sensor device and communicate parking space occupancy to a driver, wherein the post device includes a vertical post, an energy storage device, a communication device, and a light-emitter. The system may utilize one or more machine-learning algorithms and generate one or more machine-learning models to detect parking space occupancy.

19 Claims, 8 Drawing Sheets

METHODS AND SYSTEMS FOR A PARKING ASSIST SYSTEM

CROSS-REFERENCE TO RELATED APPLICATIONS

This application claims the benefit of priority of U.S. Provisional Patent Application Ser. No. 62/984,953, filed on Mar. 4, 2020, and titled "METHODS AND SYSTEMS FOR A PARKING ASSIST SYSTEM FIELD OF THE INVENTION," which is incorporated by reference herein in its entirety.

FIELD OF THE INVENTION

The present invention generally relates to the field of transportation. In particular, the present invention is directed to methods and systems for a parking assist system.

BACKGROUND

Locating an available parking space in a crowded parking lot can be challenging. Frequently, it can take an average driver 10 or more minutes to search for an open parking space in a parking lot. This can cause motorists to become frustrated, and result in motorists avoiding shops due to parking challenges. Additionally, parking log congestion attributes to pollution and adds excess carbon dioxide emissions into the atmosphere. There remains to be seen a system that alerts drivers to open parking spaces, such as those found in a parking lot, off-street, outdoor, and in an open-air parking lot just to name a few.

SUMMARY OF THE DISCLOSURE

In an aspect a solar parking assist system includes a sensor device configured to detect parking space data as a function of a camera and an energy storage device, and transmit the parking space data to a post device as a function of a communication device, and a post device, wherein the post device comprises a vertical post, a light emitter, and a solar panel, communicatively connected to the sensor device, wherein the post device is configured to collect parking space data as a function of the sensor device, and communicate a parking space occupancy to a driver as a function of the collected parking space data using the communication device and the light-emitter.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Figure 1:
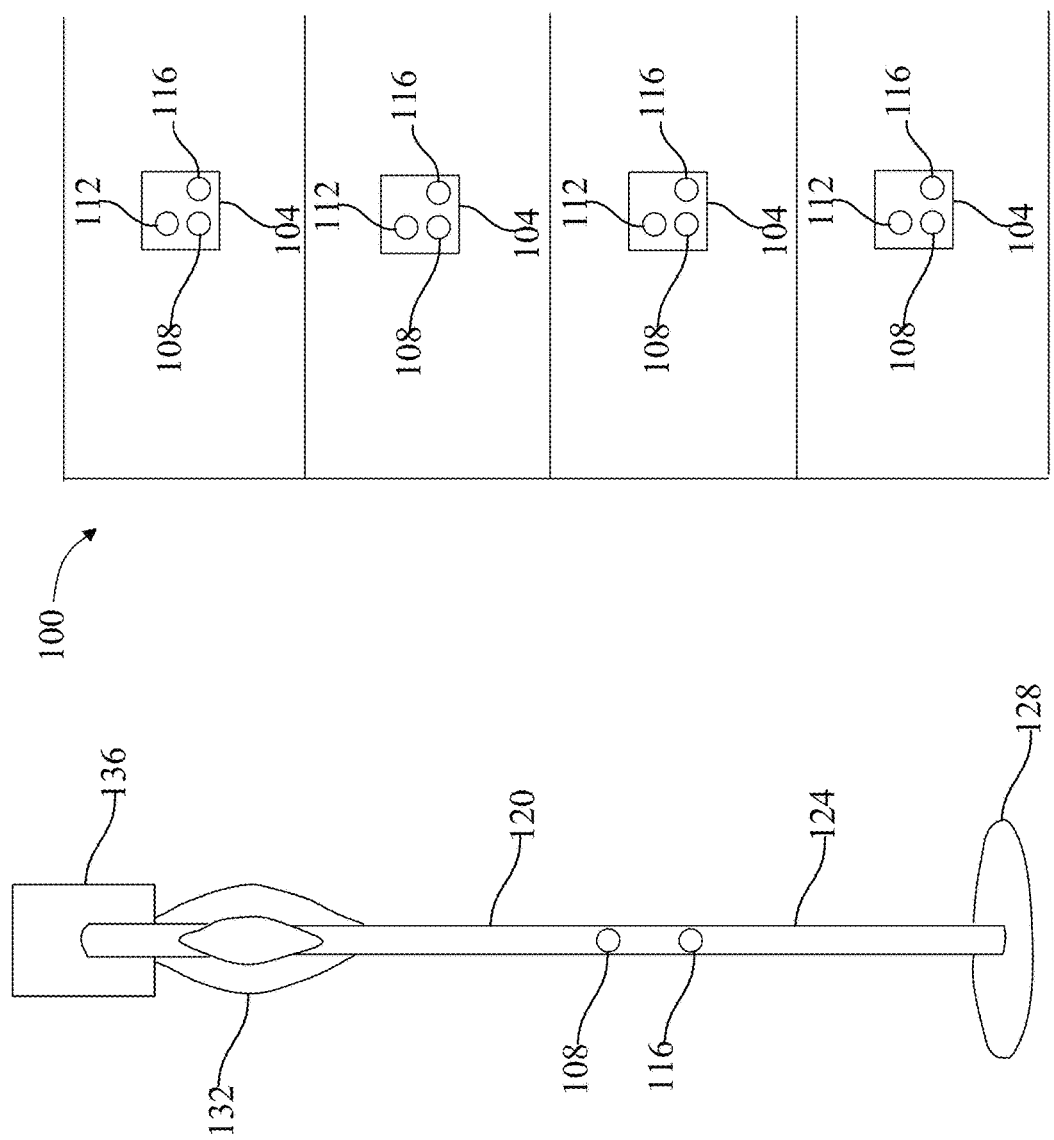
FIG. 1 is a diagrammatic representation of an exemplary embodiment of a parking assist system.

Referring now to FIG. 1, an exemplary embodiment of a system 100 for a parking assist system is illustrated. Parking assist system includes a sensor device 104. A "sensor device," as used in this disclosure, is any device, module, machine, and/or subsystem that is configured to detect events or changes in the environment and transmit changes in the environment to other electronics. A sensor device 104 may detect a change in the environment, that specifies if a parking spot located in a parking lot is occupied by a vehicle. A sensor device may include any sensor including for example, an acoustic sensor, a sound sensor, a vibration sensor, an automotive sensor, a chemical sensor, an electric current sensor, an electric potential sensor, a magnetic sensor, a radio sensor, an environment sensor, a flow sensor, a fluid velocity sensor, an ionizing radiation sensor, a subatomic particle sensor, an optical sensor, a light sensor, an imaging sensor, a photon sensor, a thermal sensor, a heat sensor, a temperature sensor, a proximity sensor, a presence sensor, a speed sensor and the like. A vehicle may include any means of carrying or transporting something. A vehicle may include a motor vehicle such as a motorcycle, car, truck, and/or bus. A vehicle may include a railed vehicle such as a train or tram. A vehicle may include a watercraft such as a ship or boat. A vehicle may include an amphibious vehicle such as a screw propelled vehicle or hovercraft. A vehicle may include an aircraft such as an airplane, helicopter, and/or spacecraft.

Still referring to FIG. 1, sensor device may include a camera mounted on a post device as described below in more detail. A "camera," as used in this disclosure, includes any optical instrument used to record an image. A camera may include a single-lens reflex camera, a large-format camera, a medium-format camera, a compact camera, a rangefinder camera, a motion picture camera, a digital camera, a camera phone, a video, and the like. As a further non-limiting example, cameras may include one or more compact digital cameras, digital SLR cameras mirrorless cameras, action cameras, 360 cameras, film cameras, and the like thereof. As a further non-limiting example, camera may include one or more Camera may include a plurality of optical detectors, visible photodetectors, or photodetectors, where an "optical detector," "visible photodetector," or "photodetector" is defined as an electronic device that alters any parameter of an electronic circuit when contacted by visible or NIR light. Optical detectors may include, without limitation, charge-coupled devices (CCD), photodiodes, avalanche photodiodes (APDs), silicon photo-multipliers (SiPMs), complementary metal-oxide-semiconductor (CMOS), scientific CMOS (sCMOS), micro-channel plates (MCPs), micro-channel plate photomultiplier tubes (MCP-PMTs), single photon avalanche diode (SPAD), Electron Bombarded Active Pixel Sensor (EBAPS), quanta image sensor (QIS), spatial phase imagers (SPI), quantum dot cameras, image intensification tubes, photovoltaic imagers, optical flow sensors and/or imagers, photoresistors and/or photosensitive or photon-detecting circuit elements, semiconductors and/or transducers. APDs, as used herein, are diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When a reverse bias is less than breakdown voltage, a gain of an APD may be approximately linear. For silicon APDs this gain may be on the order of 10-100. The material of the APD may contribute to gains.

In an embodiment, and still referring to FIG. 1, camera may contain its own dedicated post device located in the middle of a parking lot. In another embodiment, camera may share a post device with one or more additional cameras that are oriented at one or more viewing angles. Additionally or alternatively, camera may include any existing camera that may be located in a parking lot, such as those installed for surveillance and/or security reasons. In an embodiment, a camera may include one or more processors. A processor includes any processor as described herein. In an embodiment, a sensor device may include one or more processors. A processor includes any processor as described herein.

With continued reference to FIG. 1, a sensor includes an energy storage device 108. A "energy storage device," as used in this disclosure, is a collection of one or more cells whose chemical reactions create a flow of electrons in a circuit. An energy storage device may include a device that stores or delivers energy to be released in the form of electrical power, including without limitation a battery, fuel cell, capacitor, or other device typically used for storing and/or delivering electrical power. An energy storage device 108 may include an anode, a cathode, and an electrolyte that reacts with the anode and cathode. An energy storage device 108 may include a separator that may prevent an anode and cathode from touching. An anode may include a type of electrode from which electrons flow out of, when connected to a circuit. A cathode may include a type of electrode from which electrons flow into, when connected to a circuit. An electrolyte may include a substance such as a liquid or gel, that is capable of transporting ions between chemical reactions that occur at the anode and the cathode. An electrolyte may also inhibit the flow of electrons between the anode and the cathode, so that the electrons more easily flow through the external circuit rather than through the electrolyte. A separator may include any porous material that may prevent an anode and a cathode from touching, which would cause a short circuit in an energy storage device 108. A separator may be made of a variety of materials, including cotton, nylon, polyester, cardboard, and/or synthetic polymer films. A separator may not chemically react with either an anode, cathode, or electrolyte. An energy storage device 108 may contain a casing, which may include any housing or shell that may hold any internal component of an energy storage device 108. A casing may be composed of one or more materials including plastic, steel, soft polymer laminate pouches, and the like. An energy storage device 108 may contain stored energy from one or more fuel base 128$d$ sources such as coal, oil, gas, and/or nuclear. An energy storage device 108 may contain stored energy from one or more renewable sources such as solar, tidal, and/or wind sources of energy.

With continued reference to FIG. 1, a sensor may include a magnetometer 112. A "magnetometer," as used in this disclosure, is any device that measures magnetism. Magnetism, may include the direction, strength, and/or relative change of a magnetic field at a particular location. A magnetometer 112 may include vector magnetometer 112 that measure the vector components of a magnetic field. A magnetometer 112 may include a total field magnetometer 112 and/or a scalar magnetometer 112 that measure the magnitude of the vector magnetic field. An absolute magnetometer 112 may measure the absolute magnitude or vector magnetic field, using an internal calibration or known physical constants of a magnetic sensor. A relative magnetometer 112 may measure magnitude or vector magnetic field relative to a fixed but uncalibrated base 128 line. A stationary magnetometer 112 may be installed at a fixed position and may take measurements while a magnetometer 112 is stationary. A portable magnetometer 112 may be used while in motion and may be manually carried or transported in a moving object. A magnetometer 112 may detect magnetism using one or more operating principles including but not limited to a superconducting quantum interference device (SQUID), inductive pickup coils, vibrating sample magnetometer 112 (VSM), pulsed-field extraction magnetometry, torque magnetometry, faraday force magnetometry, optical magnetometry, scalar magnetometer 112, vector magnetometer 112, and the like. A magnetometer 112 may include any other sensor suitable for detecting occupancy, including optical and/or weight sensors.

With continued reference to FIG. 1, a sensor device 104 may be included in system 100; sensor device may include without limitation a control circuit and/or computing device. Sensor device 104 may include a communication device 116. A "communication device," as used in this disclosure, is any device that is capable of transmitting and receiving electronic communication. A communication device 116 includes a transmitter that is capable of generating a wireless signal, which may include without limitation a signal transmitted via electromagnetic radiation such as radio waves. As a non-limiting example, a transmitter may generate a radio frequency alternating current that may be applied to an antenna to radiate radio waves. A transmitter may provide radio communication of information over a distance. Information provided to a transmitter may be in the form of an electronic signal. A transmitter may combine information in the form of an electronic signal to be carried with a radio frequency signal which generates radio waves, also referred to as a carrier signal. Information in the form of an electronic signal may be added to a transmitter through amplitude modulation, frequency modulation, and other forms of modulation. A radio signal from a transmitter may be applied to an antenna, which radiates energy as radio waves. A transmitter may include one or more components that include but are not limited to a power supply, an electronic oscillator, a modulator, a radio frequency amplifier, and/or an impedance matching circuit. A communication device 116 includes a receiver, that is configured to receive radio waves and convert information carried by them to a usable form. A receiver may include an antenna that may intercept radio waves including electromagnetic waves and convert them to alternating currents that are applied to the receiver whereby the receiver extracts desired information. A receiver may use electronic filters to separate desired radio frequency signal from other signals received by an antenna. A receiver may include an electronic amplifier that may increase the power of a signal for further processing and may recover desired information through demodulation. A receiver may be connected to an antenna which converts energy from an incoming radio wave into radio frequency voltage which may then be applied to a receiver's input. An antenna may include an arrangement of metal conductors and may include the same antenna found in a transmitter. In an embodiment, a transmitter and a receiver may be combined and share a common circuitry and a single housing such as with a transceiver.

With continued reference to FIG. 1, communication device may include any wireless form of communication technology, including for example, wi-fi technology, Bluetooth technology, Zigbee, cellular networks, WiMAX, G.hn, and/or ethernet. For example, and without limitation, communication device may include one or more low-power wide-area networks, wherein the network may include a network only available to the users in the parking lot. As a further non-limiting example communication device may include one or more radio signals.

With continued reference to FIG. 1, parking assist system 100 includes a post device 120 in communication with a sensor device 104. A "post device," as used in this disclosure, includes any device configured to collect parking space data transmitted from a sensor device 104, and communicate parking space occupancy to a driver. A post device 120, includes a vertical post 124. A "vertical post," as used in this disclosure, includes any pole or other elongate structure fixed in an upright position. A vertical post 124 may be used as a point of attachment for other components of a post device 120, as described in more detail below. A vertical post 124 may be composed of one or more materials, including timber, metal, steel, iron, aluminum, magnesium, copper, brass, bronze, zinc, titanium, tungsten, adamantium, nickel, cobalt, tin, lead, silicon, and the like. A vertical post 124 may be composed of one or more recyclable materials including glass, paper, cardboard, metal, plastic, textiles, and the like. A vertical post 124 may be of a certain height to be visible above the height of a vehicle, so that a driver driving throughout a parking lot can see the top of a vertical post 124 indicating parking space occupancy above the height of vehicles parked within a parking lot. In an embodiment, a vertical post 124 may be connected to a base 128 at one end, where the base 128 in configured to support the post device 120. In an embodiment, the base 128 may include a screw in base 128, which may be utilized when post device 120 may not be able to be installed into the ground. In an embodiment, base 128 may include a concrete base that may be utilized to support the post device 120.

With continued reference to FIG. 1, post device 120 includes an energy storage device 108. An energy storage device 108 may include any device suitable for use as an energy storage device 108 in sensor device 104 as described above. Post device 120 includes a communication device 116. Communication device 116 may include any device suitable for use as a communication device 116 as described above.

With continued reference to FIG. 1, post device 120 includes a light-emitter 132, which may include as a non-limiting example a light-emitting diode (LED) display. A "light-emitter," as used in this disclosure, includes any panel display that utilizes light emitting diodes, or any other electronic components and/or devices as pixels for video display. Light-emitter 132 may be utilized within post device 120 to provide general illumination and/or visual display. In an embodiment, and as a non-limiting example, Light-emitter 132 may indicate the availability of parking spaces located within a parking lot. For instance and without limitation, Light-emitter 132 may illuminate and appear to be a green color when there are open parking spaces available within a certain location of a parking lot, whereas Light-emitter 132 may not illuminate and may be, as a non-limiting example, a black color when there are no parking spaces available within a certain location of parking lot. In an embodiment, and without limitation, light-emitter 132 may generate a visual display that assists drivers in identifying a parking spot. For example, and without limitation a first light emitter may display a first green color, wherein a second light emitter may then display a second green color indicating the driver is getting closer to the parking spot.

With continued reference to FIG. 1, post device 120 may include a solar panel 136. A "solar panel," as used in this disclosure, is any panel and/or other component or device that absorbs sunlight or other visible and/or invisible electromagnetic radiation as a source of energy to generate direct current electricity. Solar panel 136 may include a photovoltaic module that utilizes light energy or photons from the sun, to generate electricity through a photovoltaic effect. A photovoltaic module may utilize wafer-based 128 crystalline silicon cells and/or thin film cells. A solar panel 136 may be produced from crystalline silicon solar cells. Solar panel 136 may be produced from one or more recycled materials. In an embodiment solar panel 136 may include an absorption of light that generates either electron-hole pairs and/or excitons. For example, and without limitation, solar cell 136 absorb photons from a light source, wherein electron-hole pairs are generated as a function of doped silicon. Solar panel 136 may excite electrons from a first atomic orbital to an excited atomic orbital, wherein the electron may dissipate the energy as heat and return to its first atomic orbital and/or travel through the solar cell until it reaches the electrode to generate a current. Solar panel 136 may convert solar energy into a usable amount of direct current electricity and/or alternating current as a function of an inverter.

With continued reference to FIG. 1, post device may receive data transmitted from communication device such as a camera. In an embodiment, communication device such as a camera may store data that may be subsequently transmitted to post device utilizing an "on" or "off" input. For example, an "on" input may signify to communication device, to transmit data to post device, while an "off" input may signify to communication device, not to transmit data to post device.

With continued reference to FIG. 1, one or more sensor device 104 may be placed within one or more parking spaces located within a parking lot. Sensor device 104 may detect an open parking space and transmit data regarding the opening parking space to post device 120 utilizing a communication device 116. For example, a transmitter may generate an electronic signal indicating a sensor located in a first parking space has detected that the first parking space is available and is not occupied by a vehicle. Electronic signal may be received by a receiver located within post device 120. Post device 120 may then illuminate a Light-emitter 132 to inform a driver about an open parking space. In an embodiment, Light-emitter 132 may illuminate a green color light to inform a driver that a parking space is available. In an embodiment, Light-emitter 132 may illuminate in relation to the location of an open parking space in a parking lot. For example, post device 120 may be located in the middle of two rows within a parking lot. In such an instance, post device 120 may be in communication with sensor device 104 located in both rows, whereby Light-emitter 132 may illuminate only a section or portion of the entire Light-emitter 132 to indicate an open parking spot within one of the two rows. For example, a first half of a Light-emitter 132 facing a first parking row may illuminate in a green color to indicate an open parking space in the first row facing the half of the Light-emitter 132, whereas a second parking row that does not have any parking availability may have a second half of a Light-emitter 132 facing a second parking row not illuminated, to indicate there is not an open parking space in the second row facing the second half of the Light-emitter 132.

With continued reference to FIG. 1, sensor device 104 is configured to detect a parking space occupied by a vehicle and transmit data regarding the occupied parking space to post device 120 utilizing communication device 116. Post device 120 may then extinguish a light-emitter 132 to inform a driver about an occupied parking space. In an embodiment, a light-emitter 132 that is extinguished may appear to be of a black color. In an embodiment, post device 120 may extinguish a light-emitter 132 in location to an occupied parking space within a parking lot. For example, in an embodiment, Light-emitter 132 may be of a round, circular shape and may be located at the top of post device 120, situated in the middle of two rows in a parking lot. In such an instance, a first half of circular light-emitter 132 may be located in first parking lot row, while a second half of circular light-emitter 132 may be located in a second parking lot row. In such an instance, a first half of circular light-emitter 132 may be extinguished to indicate the first parking lot row contains all occupied parking spaces, while the second half of circular light-emitter 132 may be illuminated to indicate one or more available parking spaces within the second parking lot row.

With continued reference to FIG. 1, vertical post 124 may be connected to one or more support beams. A support beam may include any structural element that may resist loads applied to it. A support beam may be composed of any material suitable for use as vertical post 124. In an embodiment, a support beam may connect vertical post 124 to a light-emitter 132 and a solar panel 136 that may be located at the top end of vertical post 124. In an embodiment, light-emitter 132 may include a light orb that may be located atop vertical post 124 and may be in contact with solar panel 136 as described in more detail below. Light orb may be of a round, circular shape and may illuminate or extinguish to indicate parking space occupancy. In an embodiment, a solar panel 136 may surround a light-emitter 132 atop a vertical post 124 as described below in more detail.

With continued reference to FIG. 1, post device 120 may be configured to receive parking space data from a plurality of sensor device 104 wherein each of the plurality of sensor device 104 may be located in a different parking space. Post device 120 may then illuminate a light-emitter 132 to indicate the location of an open parking space. For example, a post device 120 may illuminate a portion of a light-emitter 132 to indicate a particular region of a parking space such as a certain row of parking spaces or cluster of closely located parking spaces that may have availability or that may be occupied. In an embodiment, an infinite number of sensors located within transmission range may be linked together with one particular post device 120. For example, there may be as few as one parking space on one side of post device 120 and one parking spaces on other side of post device 120 for a total of two sensors in communication with one post device 120. In yet another non-limiting example, there may be as many as twenty parking spaces one side of post device 120 with one sensor device 104 located within all twenty parking spaces, and twenty parking spaces on other side of post device 120 with an additional twenty sensor device 104 located on other side of post device 120, for a total of forty parking spaces tied to one post device 120. In an embodiment, if any parkin space is available on either side of post device 120, then Light-emitter 132 will illuminate on the corresponding side and indicate parking spot availability within the parking spaces tied to post device 120.

Still referring to FIG. 1, light-emitter 132 may appear as a light orb, having a round structure with LED lighting surrounding the entire light orb. In an embodiment, light orb may be supported by one or more support beams, as described above in detail. Support beams may connect to vertical post 124 and support light orb and solar panel 136 located atop vertical post 124. In an embodiment, post device 120 containing light orb may be placed in between and in the middle of two parking lot rows. In such an instance, light orb may illuminate and/or extinguish to indicate which of the two parking lot rows has parking availability and/or is full to inform a driver of a vehicle. In an embodiment, first half of light orb may be illuminated to indicate parking availability in a first parking row of a parking lot. In such an instance, second half of light orb may be extinguished to indicate the lack of parking availability in a second parking row of a parking lot. In an embodiment, first half of light orb may be outward facing towards first parking row and second half of light orb may be outward facing towards second parking row. Additionally or alternatively, light orb may be placed atop vertical post 124. Light orb may illuminate in a green color to indicate there is parking space availability, and light orb may extinguish and appear as a white color when no parking space is available. Light orb may also be placed in the middle of vertical post 124, with solar panel 136 sitting atop vertical post 124. In an embodiment, light orb may be supported by one or more support beams.

With continued reference to FIG. 1, post device 120 is configured to collect data relating to parking space availability and occupancy. Post device 120 is configured to assemble parking space data related to a parking lot over a specified time frame. For example, post device 120 may assemble parking space data during peak shopping hours for a parking lot located in a shopping center. Post device 120 may be configured to display parking space data related to a parking lot so that a parking lot owner or store owner may review data relating to the parking lot. In an embodiment, a parking lot owner or store owner may specify a particular time period that they seek to obtain parking space data for. Post device 120 is configured to transmit parking space data to a user client device utilizing a communication device 116. A user client device may include without limitation, a display in communication with post device 120, where a display may include any display as described herein. User client device may include an additional computing device, such as a mobile device, laptop, desktop, computer and the like. User client device may be operated by a driver, operator, and/or passenger of a vehicle so that the driver, operator, and/or passenger of the vehicle can determine parking spot availability before departing or upon arrival at a parking lot. Post device 120 may be configured to transmit parking space data to an autonomous vehicle utilizing a communication device 116. An autonomous vehicle may include any vehicle capable of sensing its environment and moving with little or no human input. In an embodiment and without limitation, autonomous vehicle may receive a signal and/or direction as a function of the communication device and traverse through a parking lot towards an open parking space identified by system 100. In another embodiment, autonomous vehicle may receive a notification and/or communication that the parking lot is full. For example, and without limitation, communication device 116 may signal to a vehicle and/or autonomous vehicle that a parking lot is full, wherein communication device 116 recommends one or more subsequent parking lots that may or may not have an open parking space for the vehicle and/or autonomous vehicle.

With continued reference to FIG. 1, parking space data may be assembled at sensor device, such as at a camera location using main power. Sensor device, including a camera may be configured to transmit parking space data to a user client device utilizing communication device 116 for example. In an embodiment, sensor device may be configured to transmit parking space data to a web-based portal to display the information such as parking space availability for multiple users to view. In an embodiment, sensor device such as a camera, may be configured to perform one or more machine-learning algorithms to detect the presence and/or absence of vehicles in parking spaces. Machine-learning algorithms may generate correlations, mathematical relationships, and/or other relationships between inputs of data to outputs of data, which may be generated from a training set containing a plurality, which may be thousands or millions, of inputs and related output data points; each input may be mapped to a related output in training set. Training set data utilized to generate mathematical algorithms may be obtained from multiple sources, such as data obtained from studies, journals, and/or other platforms. Sources may include information that is already in the public domain, such as data that is open source and available for the public to use. Initial training set data obtained for system 100 to generate initial models may be gathered from any scientific journals, data sets already available in the public domain such as open-source data, and/or from initial information provided by users.

With continued reference to FIG. 1, machine-learning processes may further be performed as a function of context data, circumstances, data, or other information available to system 100 concerning current or past interactions with system 100 and/or third-party processes, platforms, or devices. Machine-learning algorithms as used herein are processes executed by computing devices to improve accuracy and efficiency of other processes performed by the computing devices through statistical or mathematical measures of accuracy and efficiency. Machine learning may function by measuring a difference between predicted answers or outputs and goal answers or outputs representing ideal or "real-world" outcomes the other processes are intended to approximate. Predicted answers or outputs may be produced by an initial or intermediate version of the process to be generated, which process may be modified as a result of the difference between predicted answers or outputs and goal answers or outputs. Initial processes to be improved may be created by a programmer or user or may be generated according to a given machine-learning algorithm using data initially available. Inputs and goal outputs may be provided in two data sets from which the machine learning algorithm may derive the above-described calculations; for instance, a first set of inputs and corresponding goal outputs may be provided and used to create a mathematical relationship between inputs and outputs that forms a basis of an initial or intermediate process, and which may be tested against further provided inputs and goal outputs. Data sets representing inputs and corresponding goal outputs may be continuously updated with additional data; machine-learning process may continue to learn from additional data produced when machine learning process analyzes outputs of "live" processes produced by machine-learning processes.

With continued reference to FIG. 1, machine-learning algorithm may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes. Machine-learning algorithms may include supervised machine-learning algorithms. Machine-learning algorithms may include unsupervised machine-learning algorithms. Machine-learning algorithms may include lazy-learning machine-learning algorithms. In an embodiment, any component of system 100 may be configured to generate one or more machine-learning algorithms.

With continued reference to FIG. 1, machine-learning processes may include generating one or more machine-learning models. A "machine-learning model," as used in this disclosure, is a process that automatedly uses a body of data known as "training data" and/or a "training set" to generate an algorithm that will be performed such as by a processor located within a camera, to produce outputs given data provided as inputs; this is in contrast to a non-machine-learning software program where the commands to be executed are determined in advance by a user and written in a programming language. For example, and without limitation training data may be used to train machine-learning model. In an embodiment, one or more machine-learning algorithms and/or machine-learning models may be utilized for license plate recognition of a vehicle.

In an embodiment, and still referring to FIG. 1, system 100 may identify a vehicle as a function of an identification machine-learning model. As used in this disclosure "identification machine-learning model" is a machine-learning model to identify a vehicle output given identification elements as inputs; this is in contrast to a non-machine learning software program where the commands to be executed are determined in advance by a user and written in a programming language. As used in this disclosure "identification inputs" are inputs associated with one or more characteristic qualities of a vehicle. For example, and without limitation, license plate numbers, registration numbers, vehicle models, vehicle makes, vehicle years, vehicle colors, and the like thereof. Identification machine-learning model may include one or more identification machine-learning processes such as supervised, unsupervised, or reinforcement machine-learning processes that system 100 may or may not use in the determination of identification a vehicle. An identification machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train identification machine-learning process as a function of an identification training set. As used in this disclosure "identification training set" is a training set that correlates an identification element to a vehicle. For example, and without limitation, an identification element of a black Subaru with a license plate number 1NXS16 may relate to a vehicle of an undercover law enforcement officer. The identification training set may be received as a function of user-entered identification elements and/or vehicles. System 100 may obtain identification training set by receiving correlations of identification elements that were previously received and/or determined during a previous iteration of identifying a vehicle. The identification training set may be obtained in the form of one or more user-entered correlations of an identification elements to a vehicle. For example, and without limitation, a camera may be positioned at one or more angles to obtain an identification element of the letters located on a license plate and identify the vehicle as a function of identification machine-learning model using identification training data. For example, and without limitation, a vehicle may be identified as a function of identifying one or more license plates associated with individuals and/or government officials. As a further non-limiting example, a vehicle may be identified as a function of identifying one or more license plates associated with emergency personnel.

In an embodiment, and still referring to FIG. 1, system 100 may identify one or more vehicles and/or license plates by any suitable method, including without limitation an image classifier. An "image classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Image classifier may be configured to output at least a datum that labels or otherwise identifies a set of data that are clustered together, found to be close under a distance metric as described below, or the like. For example, and without limitation image classifier may output one or more identities of vehicles, such as owners of the vehicle, drivers of the vehicle, insurance companies associated with the vehicle, and the like thereof. Computing device 104 and/or another device may generate a classifier using a classification algorithm, defined as a processes whereby computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

In an embodiment and still referring to FIG. 1, computing device may identify a vehicle and/or object and automatically pay for the parking space. For example, and without limitation image classifier may classify a vehicle to an emergency services vehicle, wherein the parking space has a price of $5.00 and is automatically charged to the account owner for that vehicle. As a further non-limiting example, image classifier may classify a vehicle to a consumer vehicle, wherein the parking space has a price of $25.00 and is automatically charged to the consumer that parked in the parking space. In an embodiment, and without limitation, image classifier may classify one or more groups of vehicles that park within close proximity to one another to a single account. For example, a corporation may have 5 company cars that are parked in a single lane of a parking lot, wherein image classifier may classify the vehicles to a single account owner and charge the account owner for the 5 vehicles that are classified together.

Figure 2A:
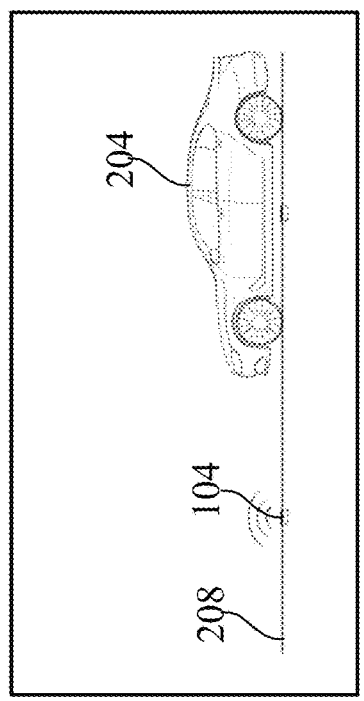
FIGS. 2A-2C are diagrammatic representations of an exemplary embodiment of a sensor device.
Figure 2B:
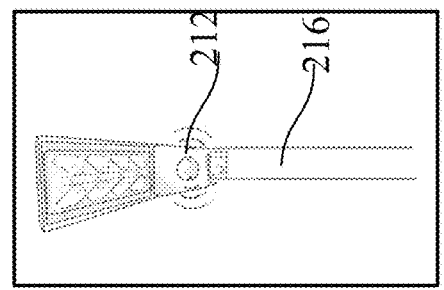
Figure 2C:
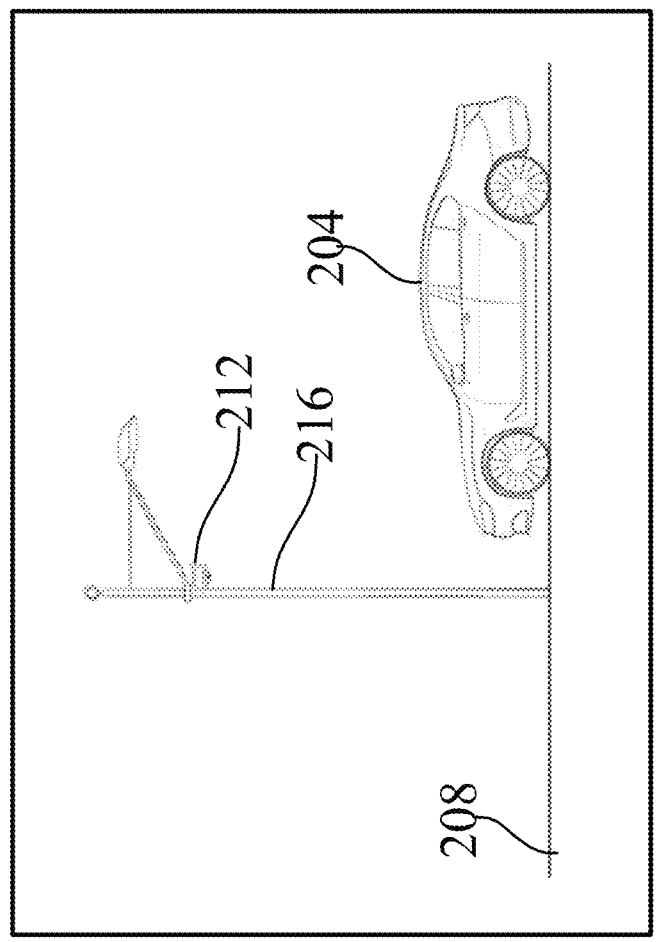

Referring now to FIGS. 2A-2B, an exemplary embodiment 200 of sensor device 104 is illustrated. In FIG. 2A, sensor device 104, may be configured to detect the presence or absence of a vehicle 204, in parking space 208. A vehicle 204, includes any of the vehicles as described above in more detail in reference to FIG. 1. Referring now to FIG. 2B, sensor device 104 may include a camera 212 attached to a light post 216. Camera may include any camera as described herein. Light post 216 may include any pole located in a parking lot, pathway, and/or driveway. Light post 216 may include any standard parking lot light post. Referring now to FIG. 2C, camera 212 may be attached to light post 216, where camera 212 is able to detect a vehicle already located in parking space 208.

In an embodiment, and still referring to FIG. 2, post device 120 may be situated in between rows of parking spaces 208. In an embodiment, post device 120 may illuminate light-emitter 132 to appear as a green color, to indicate available parking spaces that are open, within a certain location in a parking lot. In an embodiment, light-emitter 132 may illuminate and/or extinguish light-emitter 132 to indicate a particular row that does or does not have availability. For example, post device 120 may be situated in between two parking rows, and light-emitter 132 may be illuminated on a first side to indicate availability in a first parking row, and light-emitter 132 may be extinguished on a second side to indicate there is no parking availability in a second parking row. Post device 120 may be of a certain height above vehicles parked in a parking lot, so that a driver of a vehicle may be able to see from a distance, whether a particular row has parking availability or not.

Figure 3:
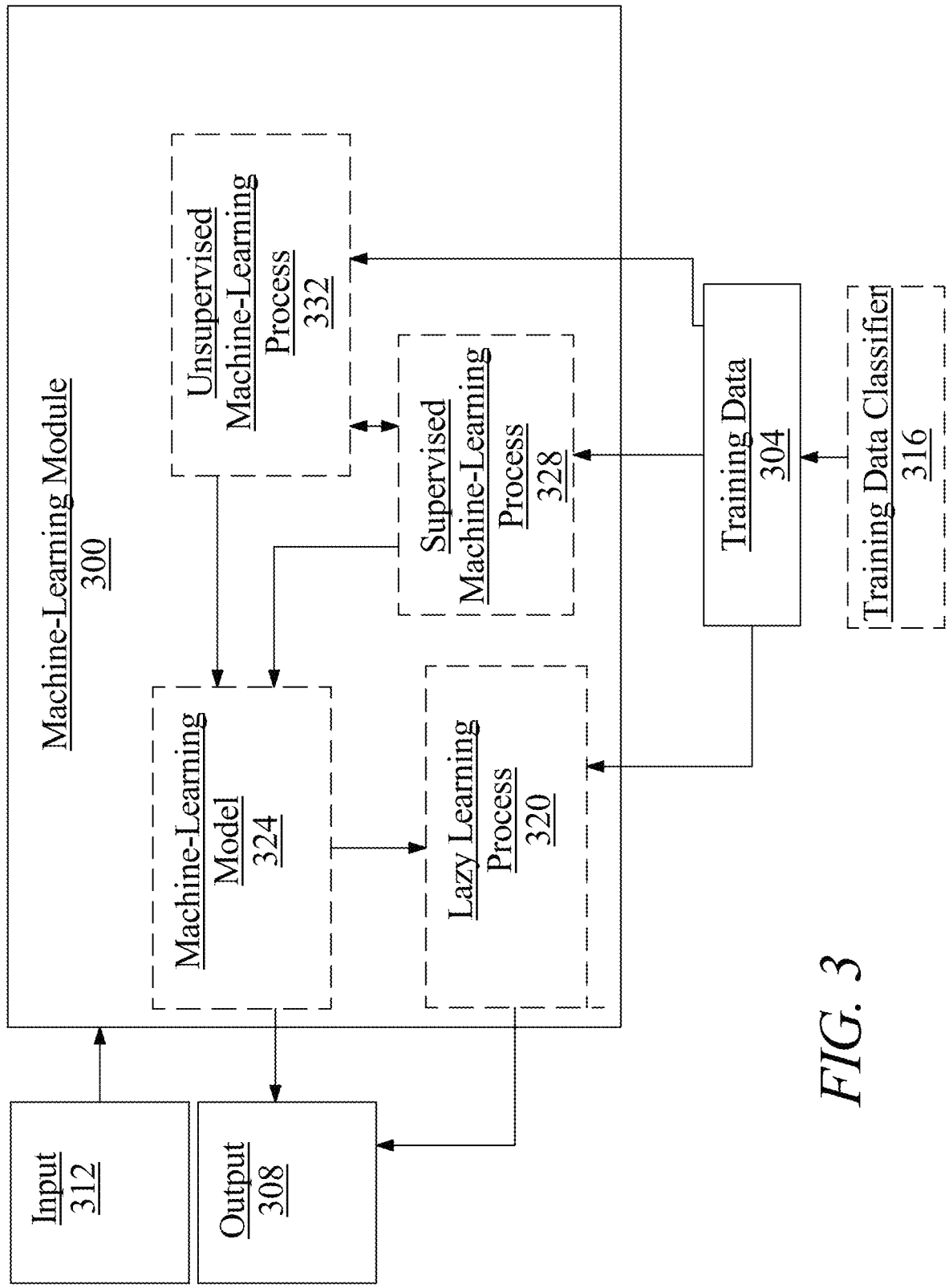
FIG. 3 is a block diagram of an exemplary embodiment of a machine-learning module.

Referring now to FIG. 3, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, identification inputs may result in identifying a vehicle.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to sub-categories of identification elements such as license plates, registrations, colors, makes, models and the like thereof.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include identification elements as described above as inputs, identified vehicles as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
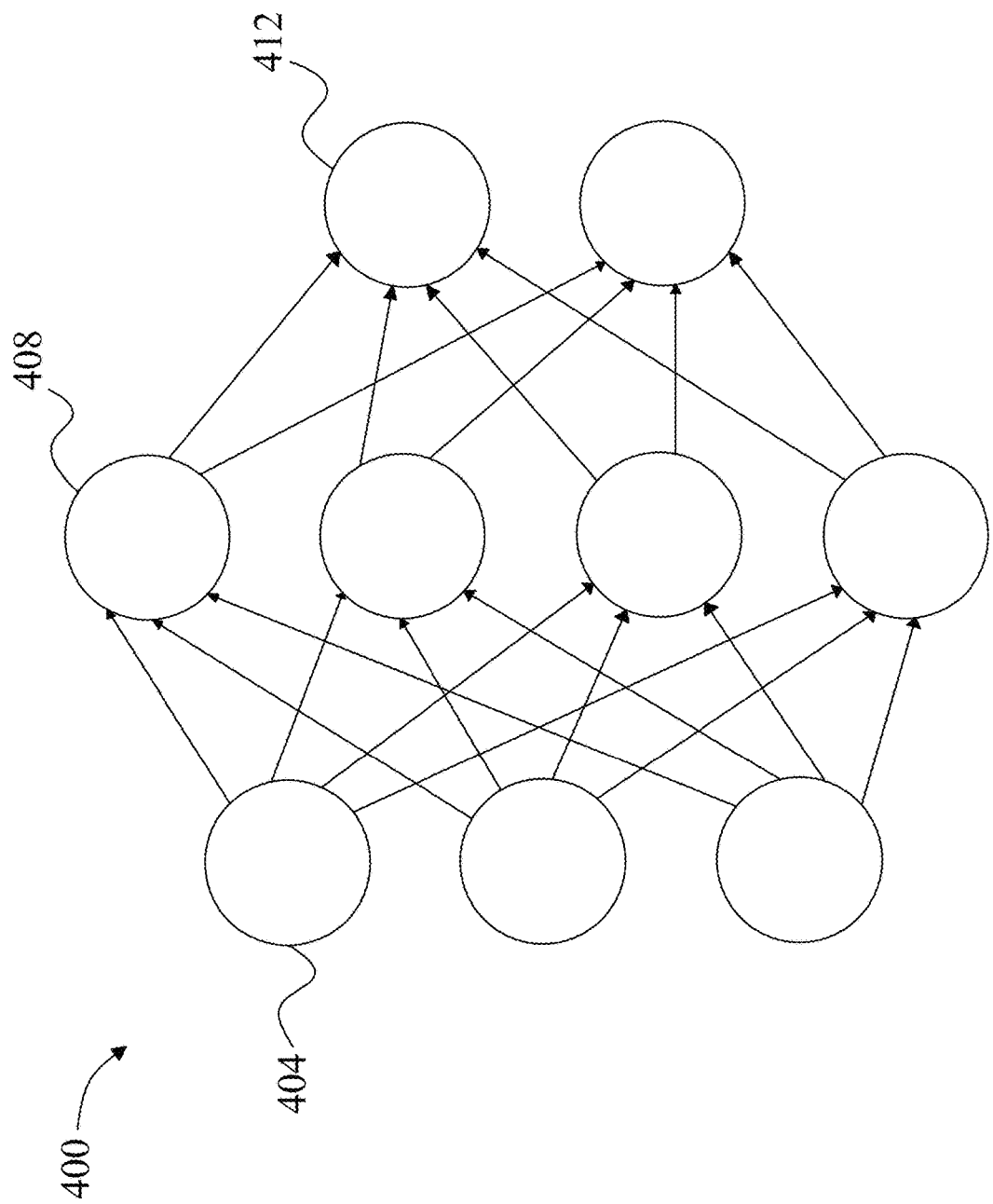
FIG. 4 is a block diagram illustrating an exemplary embodiment of a neural network.

Referring now to FIG. 4, an exemplary embodiment of a neural network 400 is illustrated. Neural network 404 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Figure 5:
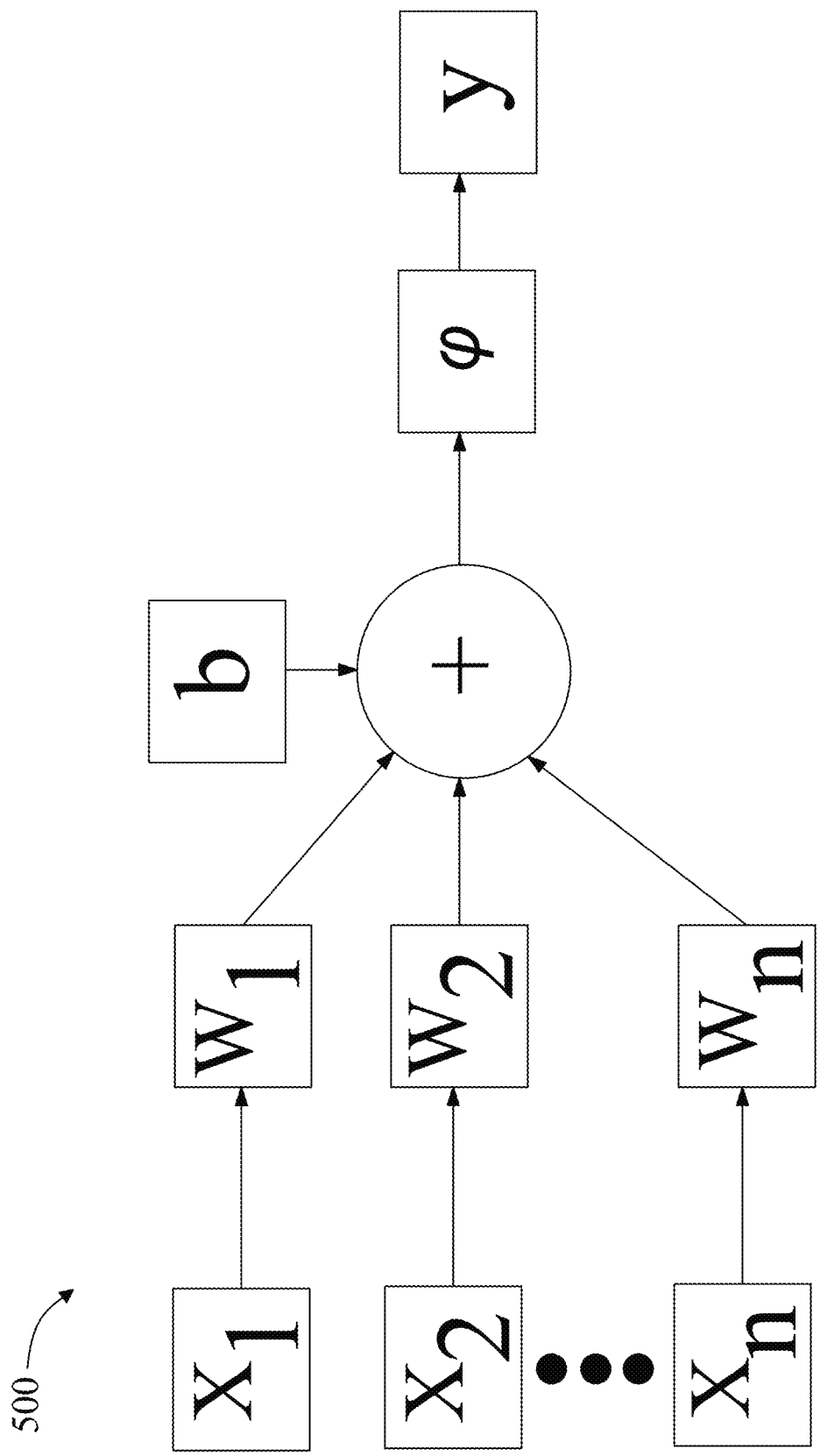
FIG. 5 is a block diagram illustrating an exemplary embodiment of a node in a neural network.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 5, a neural network may receive images from one or more sensors as inputs and output vectors representing such images according to weights $w_i$ that are derived using machine-learning processes as described in this disclosure.

Figure 6:
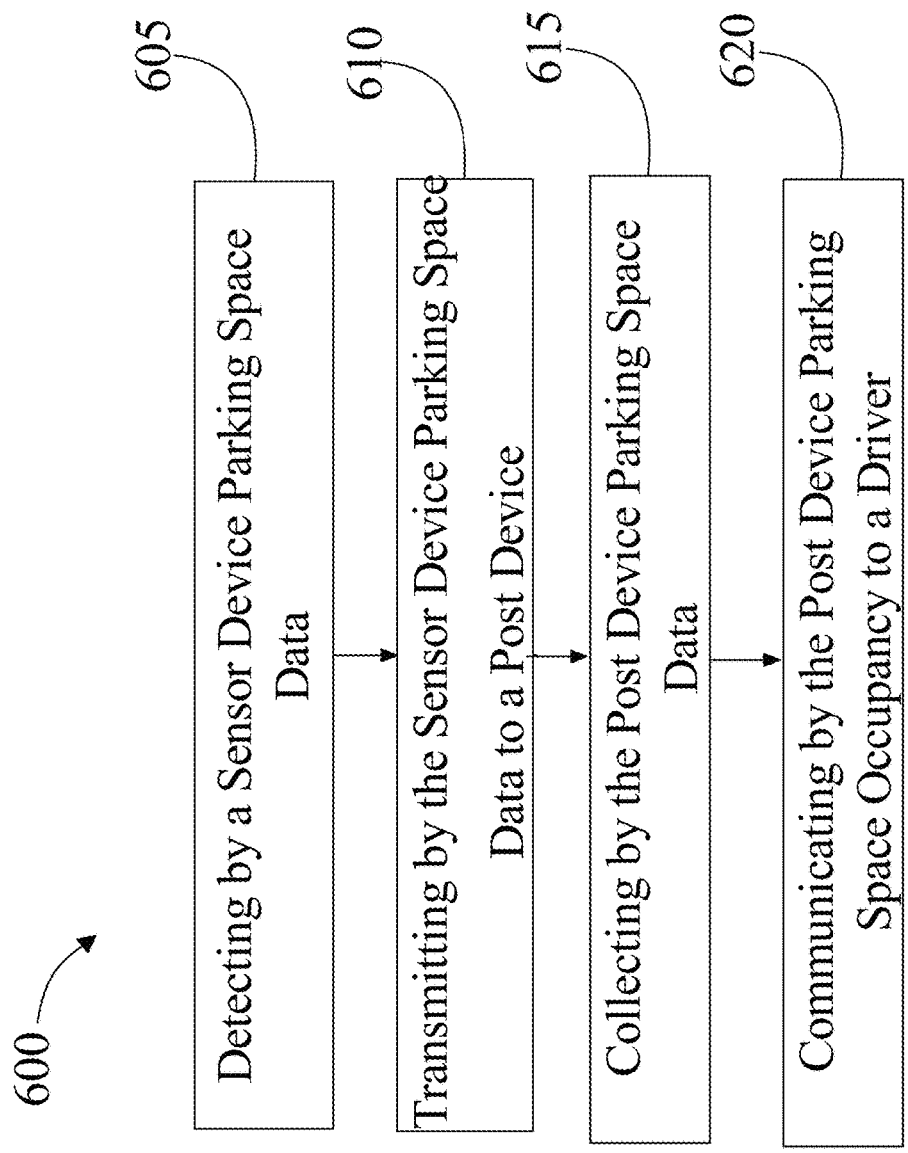
FIG. 6 is a process flow diagram illustrating an exemplary embodiment of a solar parking assist method.

Referring now to FIG. 6, an exemplary embodiment of a method 600 of a solar parking assist is illustrated. At step 605, a sensor device 104 detects parking space data. A sensor device 104 includes any of the sensor device 104 as described above in more detail in reference to FIGS. 1-5. A sensor device 104 includes an energy storage device 108, and a communication device 116. A sensor device 104 may include a camera, as described above in more detail in reference to FIGS. 1-3. In an embodiment, sensor device 104 such as a camera, may be configured to collect data and may perform one or more machine-learning algorithms on data, as described above in more detail in reference to FIGS. 1-5. In an embodiment, camera may perform one or more machine-learning algorithms and may transmit the information to another component of system 100 such as post device, a processor, and/or a cloud where data may be stored. Cloud includes any of the clouds as described above in more detail. Parking space data may indicate if a parking space is occupied by a vehicle or if a parking space is free and is not occupied by a vehicle. A vehicle includes any of the vehicles as described above in more detail in reference to FIGS. 1-5. In an embodiment, sensor device 104 may detect parking space data utilizing magnetometer 112 to detect magnetic fields located within a parking space. In an embodiment, each parking space located in a parking lot may contain its own sensor device 104 to detect the absence or presence of a vehicle in each individual parking space, at any given time.

With continued reference to FIG. 6, at step 610, a sensor device 104 transmits parking space data to a post device 120 in communication with sensor device 104. Post device 120 includes any of the post device 120 as described above in more detail in reference to FIGS. 1-5. Post device 120 includes a vertical post 124, an energy storage device 108, a communication device 116, a light-emitter 132, and a solar panel 136 as described above in more detail in reference to FIGS. 1-5. In an embodiment, a plurality of post device 120 may be located a different location within a parking lot. Each post device 120 may be in communication with one or more sensor device 104 base 128 on the location of a post device 120. A sensor device 104 may be in communication with a post device 120 when a sensor device 104 can transmit data with a post device 120. In an embodiment, a plurality of post device 120 may be placed in a median position in between two separate parking rows. In such an instance, each post device 120 may communicate with sensor device 104 located in two parking rows. Sensor device 104 may transmit parking space data to a post device 120 utilizing any network methodology as described herein. In an embodiment, sensor device 104 may transmit parking space data from transmitter located within communication device 116 located within sensor device 104, to a receiver located within communication device 116 located within post device 120. Transmitting may include transmitting data including any of the data described herein to another processor, a cloud, and/or another other component of system 100 before being sent to post device 120. A "cloud," as used in this disclosure, includes any on-demand availability of computer system resources, such as data storage and computing power, without direct active management by a user. A cloud may include one or more data centers available to many users over the Internet. A cloud may include a private cloud, a public cloud, and/or a hybrid cloud.

With continued reference to FIG. 6, at step 615, a post device 120 in communication with a sensor device 104 collects parking space data transmitted from a sensor device 104. In an embodiment, a post device 120 may collect parking space data from one or more sensor device 104. In an embodiment, a post device 120 may assemble parking space data related to a parking lot over a specified time frame and display the parking space data related to the parking lot, so that a business owner or owner of the parking lot can determine parking lot use and functionality. In an embodiment, post device 120 may transmit parking space data to a user client device, which may include any device as described above in more detail in reference to FIGS. 1-5. Collection of parking space data may be performed by any component of system 100, including a processor, a cloud independent of post device 120, and/or any sensor including a camera. Any component of system 100 may be configured to perform any machine-learning algorithm and/or machine-learning process as described herein.

With continued reference to FIG. 6, at step 620, a post device 120 in communication with a sensor device 104 communicates parking space occupancy to driver. A post device 120 may communicate parking space occupancy utilizing light-emitter 132, as described above in more detail. For example, post device 120 may receive parking space data from a plurality of sensor device 104 wherein each of the plurality of sensor device 104 is located in a different parking space in a parking lot. Post device 120 may then illuminate a light-emitter 132 located atop post device 120 to indicate the location of an open parking space. In an embodiment, light-emitter 132 may appear to have a particular color to indicate to a driver or passenger of a vehicle that there is parking space availability within a certain parking lot row. For example, light-emitter 132 may emit a blue color, to indicate that a handicapped parking space may be available, while a non-handicapped parking may cause light-emitter 132 to appear as another color, that may be of a special significance to a lot owner. For example, a particular section of a parking garage may be cause light-emitter 132 to emit a particular color to indicate a section of a parking area such as a parking lot and/or the top floor of a parking garage that may indicate premium spaces within a parking garage where a subscriber may pay money to park in the premium spaces because parking may be guaranteed or premium parking spaces may be located at preferred locations such as near a stairwell, elevator, and/or entrance to a building such as a shopping mall just to name a few. In an embodiment, a portion of a light-emitter 132 may be illuminated to indicate a particular location where there is parking space availability. A post device 120 may receive parking space data from a plurality of sensor device 104 wherein each of the plurality of sensor device 104 is located in a different parking space. A post device 120 may extinguish a light-emitter 132 located within the post device 120 to indicate the absence of an open parking space. For example, a light-emitter 132 may dark and appear to black out when there is no more parking availability within a particular location of a parking lot. In an embodiment, a portion of a light-emitter 132 located atop post device 120 may be extinguished to indicate that a particular row or a particular location of a parking lot has no more parking availability. Post device 120 may transmit parking space occupancy to an autonomous vehicle as described above in more detail. Parking space occupancy may be transmitted to an autonomous vehicle utilizing any processor, and/or communication device as described herein. For example, parking space occupancy may be transmitted to an autonomous vehicle by a processor located within a communication device such as a camera. Light-emitter 132 may be visible by other passengers in a vehicle to help a driver identify where there is parking space availability. In an embodiment, post device 120 may transmit a message to a user client device so that a driver and/or passenger know upon arrival at a parking lot or upon leaving to drive to parking lot where there are available parking spaces. Communications regarding parking space occupancy may be communicated to a driver of a vehicle directly from a processor, and/or from information stored in a cloud via communication device.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
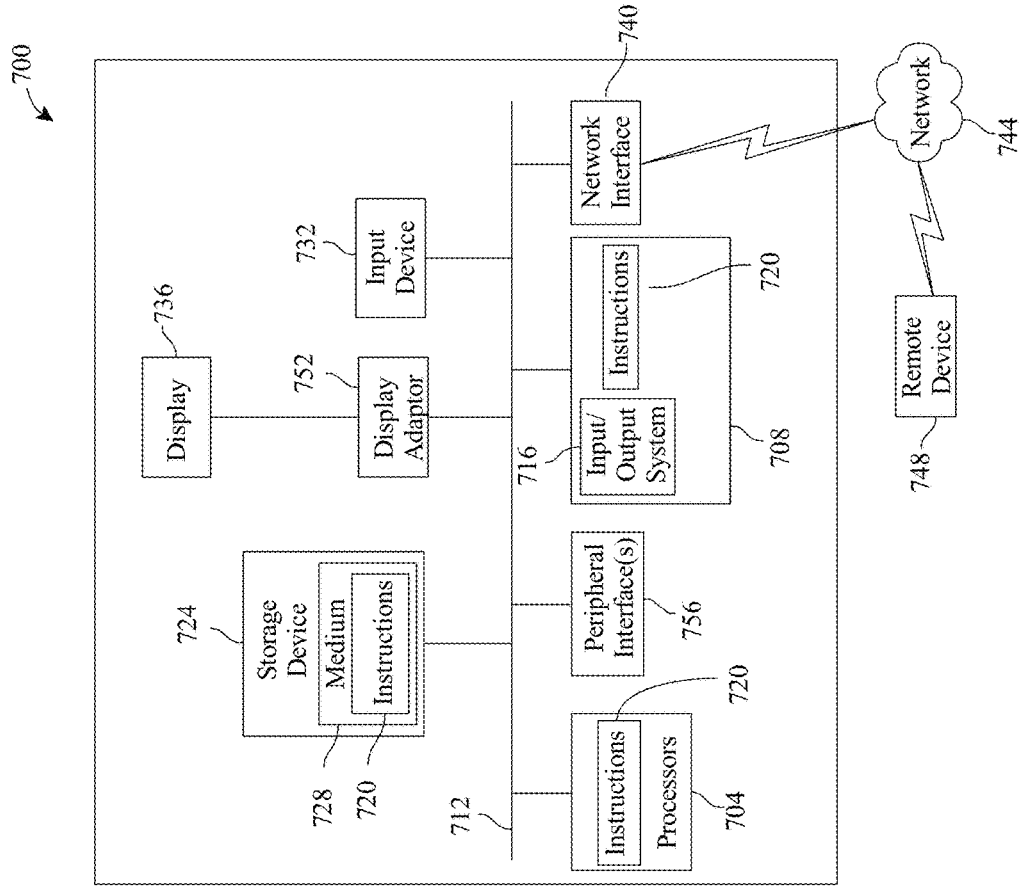
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 12 via a peripheral interface 5576. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A solar parking assist system, the system comprising:
   a sensor device configured to:
      detect parking space data as a function of a camera and an energy storage device; and
      transmit the parking space data to a post device, as a function of a communication device, and
   a post device communicatively connected to the sensor device, the post device comprising a vertical post, a light emitter, and a solar panel, and wherein the post device is configured to:
      collect parking space data as a function of the sensor device;
      receive parking space data from a plurality of sensor devices wherein each of the plurality of sensor devices is located in a different parking space;
      communicate a parking space occupancy to a driver as a function of the collected parking space data using the communication device and the light-emitter; and
      illuminate the light-emitter to indicate the location of an open parking space.

2. The system of claim 1, wherein the sensor device further comprises a magnetometer.

3. The system of claim 1, wherein the sensor device further comprises a processor.

4. The system of claim 1, wherein the sensor device is further configured to: detect an open parking space;
   transmit data regarding the open parking space to the post device utilizing the communication device; and
   illuminate the light-emitter to inform a driver about the open parking space.

5. The system of claim 4, wherein the light-emitter is illuminated in relation to the location of the open parking space in a parking lot.

6. The system of claim 1, wherein the sensor device is further configured to: detect an occupied parking space;
   transmit data regarding the occupied parking space to the post device utilizing the communication device; and
   extinguish the light-emitter to inform a driver about the occupied parking space.

7. The system of claim 6, wherein the light-emitter is extinguished in relation to the location of the occupied parking space in a parking lot.

8. The system of claim 1, wherein the communication device further comprises: a transmitter configured to transmit a radio communication; and
   a receiver configured to convert information contained within the radio communication into a useable form.

9. The system of claim 1, wherein the communication device further comprises a wireless form of communication.

10. The system of claim 1, wherein the vertical post is connected to a base configured to support the post device.

11. The system of claim 10, wherein the vertical post is connected to a support beam wherein the support beam connects the vertical post to the light-emitter and the solar panel.

12. The system of claim 10, wherein the light-emitter further comprises a light orb located atop the vertical post and in contact with the solar panel.

13. The system of claim 10, wherein the solar panel is configured to surround the light-emitter atop the vertical post.

14. The system of claim 1, wherein the post device is further configured to:
- assemble parking space data related to a parking lot over a specified time frame; and
- display the parking space data related to a parking lot.

15. The system of claim 1, wherein the parking assist system is further configured to transmit parking space data to a user client device utilizing the communication device.

16. The system of claim 1, wherein the parking assist system is further configured to transmit parking space data to an autonomous vehicle utilizing the communication device.

17. The system of claim 1, wherein the parking assist system is further configured to transmit parking space data to a database.

18. The system of claim 1, wherein the sensor device is further configured to identify a vehicle.

19. The system of claim 18, wherein identifying the vehicle further comprises: obtaining an identification training set; and
- identifying the vehicle as a function of the parking space data using an identification machine-learning model, wherein the identification machine-learning model is trained as a function of the identification training set.

* * * * *